United States Patent
Michalowski et al.

(10) Patent No.: US 8,805,705 B2
(45) Date of Patent: Aug. 12, 2014

(54) SYSTEM AND METHOD FOR ADMINISTERING VARIABLE ANNUITIES

(75) Inventors: Philip W. Michalowski, Glastonbury, CT (US); Keith E. Golembiewski, Suffield, CT (US); Joseph M. Weiss, Glastonbury, CT (US)

(73) Assignee: Hartford Fire Insurance Company, Hartford, CT (US)

( * ) Notice: Subject to any disclaimer, the term of this patent is extended or adjusted under 35 U.S.C. 154(b) by 1533 days.

(21) Appl. No.: 12/123,636

(22) Filed: May 20, 2008

(65) Prior Publication Data

US 2009/0292563 A1 Nov. 26, 2009

(51) Int. Cl.
 *G06Q 40/08* (2012.01)
 *G06Q 40/06* (2012.01)
(52) U.S. Cl.
 CPC ............... *G06Q 40/06* (2013.01); *G06Q 40/08* (2013.01)
 USPC ........................................................... 705/4
(58) Field of Classification Search
 CPC .................................................... G06Q 40/08
 See application file for complete search history.

(56) References Cited

U.S. PATENT DOCUMENTS

| | | | |
|---|---|---|---|
| 5,742,775 A * | 4/1998 | King ................................. | 705/38 |
| 5,754,980 A | 5/1998 | Anderson et al. | |
| 5,878,405 A | 3/1999 | Grant et al. | |
| 5,893,071 A | 4/1999 | Cooperstein | |
| 5,913,198 A | 6/1999 | Banks | |
| 5,926,800 A | 7/1999 | Baronowski et al. | |
| 5,933,815 A | 8/1999 | Golden | |
| 6,456,979 B1 * | 9/2002 | Flagg ................................. | 705/4 |
| 6,611,808 B1 | 8/2003 | Preti et al. | |
| 6,611,815 B1 | 8/2003 | Lewis et al. | |
| 7,016,871 B1 | 3/2006 | Fisher et al. | |
| 7,089,201 B1 | 8/2006 | Dellinger et al. | |
| 7,113,913 B1 | 9/2006 | Davis et al. | |
| 7,124,088 B2 | 10/2006 | Bauer et al. | |
| 7,444,300 B1 * | 10/2008 | Broms et al. ..................... | 705/35 |
| 7,496,531 B1 * | 2/2009 | Gastineau et al. .............. | 705/35 |
| 7,685,047 B2 * | 3/2010 | Coates ......................... | 705/36 R |
| 8,271,301 B1 * | 9/2012 | Nordyke et al. .................. | 705/4 |

(Continued)

OTHER PUBLICATIONS

The Washingtonpost.com "More Funds Adopt Performance Based Fees" by Tim Paradis, Apr. 8, 2007, 2 pages.*

(Continued)

*Primary Examiner* — Bruce I Ebersman
(74) *Attorney, Agent, or Firm* — Howard IP Law Group, PC

(57) ABSTRACT

A system for administering a variable annuity account includes a processor and a memory in communication with the processor. The processor is adapted to: access from a memory storage device data indicative of actual performance over a time period of a fund within the variable annuity account; access from a memory storage device data indicative of benchmark performance of the fund; compare the actual performance data to the benchmark performance data, and store the result of the comparison in the memory; based on the results of the step of comparing, determine whether to refund to the account an amount; if the amount is to be refunded, access data indicative of the refund amount; access data indicative of the asset value of the account; determine an updated asset value based on the asset value and the amount to be refunded; store the determined updated asset value in a memory storage location; and provide an output signal including data indicative of the change in the asset value of the account.

23 Claims, 6 Drawing Sheets

(56) References Cited

U.S. PATENT DOCUMENTS

| | | | |
|---|---|---|---|
| 2001/0014873 A1 | 8/2001 | Henderson et al. | |
| 2001/0047325 A1 | 11/2001 | Livingston | |
| 2002/0035527 A1 | 3/2002 | Corrin | |
| 2002/0174045 A1 | 11/2002 | Arena et al. | |
| 2003/0088430 A1 | 5/2003 | Ruark | |
| 2003/0105652 A1 | 6/2003 | Arena et al. | |
| 2003/0120570 A1 | 6/2003 | Dellinger et al. | |
| 2003/0163402 A1 | 8/2003 | Kincart | |
| 2004/0039608 A1 | 2/2004 | Mazur et al. | |
| 2004/0088236 A1 | 5/2004 | Manning | |
| 2004/0172350 A1 | 9/2004 | Atkinson et al. | |
| 2004/0181436 A1 | 9/2004 | Lange | |
| 2004/0204951 A1 | 10/2004 | Wood et al. | |
| 2004/0267647 A1 | 12/2004 | Brisbois | |
| 2005/0010454 A1* | 1/2005 | Falk et al. | 705/4 |
| 2005/0015330 A1* | 1/2005 | Beery et al. | 705/38 |
| 2005/0080698 A1 | 4/2005 | Perg et al. | |
| 2005/0144103 A1 | 6/2005 | Perg et al. | |
| 2006/0074787 A1 | 4/2006 | Perg et al. | |
| 2006/0080147 A1* | 4/2006 | Greenstein | 705/2 |
| 2006/0080148 A1 | 4/2006 | Koresko | |
| 2006/0089892 A1 | 4/2006 | Sullivan et al. | |
| 2006/0143055 A1 | 6/2006 | Loy et al. | |
| 2006/0143100 A1* | 6/2006 | Plonski | 705/35 |
| 2006/0149651 A1 | 7/2006 | Robinson | |
| 2006/0190373 A1 | 8/2006 | Perg et al. | |
| 2006/0206398 A1 | 9/2006 | Coughlin | |
| 2006/0206401 A1 | 9/2006 | Abbs et al. | |
| 2006/0212379 A1 | 9/2006 | Perg et al. | |
| 2006/0212380 A1 | 9/2006 | Williams et al. | |
| 2007/0011063 A1 | 1/2007 | Shelon et al. | |
| 2007/0011069 A1 | 1/2007 | Bevacqua, Jr. | |
| 2007/0011086 A1 | 1/2007 | Dellinger et al. | |
| 2007/0021986 A1 | 1/2007 | Cheung et al. | |
| 2007/0038488 A1 | 2/2007 | Bauer et al. | |
| 2007/0078690 A1 | 4/2007 | Kohl | |
| 2007/0100715 A1 | 5/2007 | O'Donnell et al. | |
| 2007/0100720 A1* | 5/2007 | Bonvouloir | 705/36 R |
| 2007/0100727 A1 | 5/2007 | Multer et al. | |
| 2007/0106589 A1 | 5/2007 | Schirripa | |
| 2007/0162380 A1 | 7/2007 | Conroy | |
| 2007/0198352 A1 | 8/2007 | Kannegiesser | |
| 2007/0198377 A1 | 8/2007 | Livingston et al. | |
| 2007/0219894 A1* | 9/2007 | Guichard | 705/36 R |
| 2007/0239572 A1 | 10/2007 | Harris et al. | |
| 2007/0244777 A1 | 10/2007 | Torre et al. | |
| 2007/0271201 A1 | 11/2007 | Armand et al. | |
| 2007/0278288 A1 | 12/2007 | Simmons | |
| 2008/0109341 A1* | 5/2008 | Stiff et al. | 705/36 R |

OTHER PUBLICATIONS

A view from the Top, Paula Meyer, President of American Express Funds, Fund Action V. 15, n. 20, p. 14 May 17, 2004, describes the Amex funds and annuities, each fund will provide a discount if the fund underperforms.*

Key to Making Retirement Savings last: The Withdrawal Rate, New York Life, www.newyorklife.com/cda/0,3254,14198,00.html. (accessed May 22, 2008).

Prospectus, Penn Mutual Variable Annuity Account III, Enhanced Credit Variable Annuity; May 1, 2007.

"Glossary of Insurance Terms", Insurance Information Institute, http:www.iii.org/media/glossary (Jan. 1, 2008).

Penn Mutual Variable Annuity Account III, SEC Form 497, Filed Oct. 2, 2006.

New York Life Longevity Benefit Variable Annuity Brochure, New York Life Insurance Company, May 2007.

New York Life Longevity Benefit Variable Annuity FactSheet, New York Life Insurance Company, May 2007.

Paradis, T., More Funds Adopt Performance-Based Fees, Washingtonpost.com (Associated Press), Apr. 8, 2007.

"Facts about the New York Life Longevity Benefit Variable Annuity Product", New York Life Insurance Company, May 2007.

New York Life Longevity Benefit Variable Annuity Prospectus Amendment dated Aug. 15, 2007, New York Life Insurance Company, Aug. 2007.

S&P U.S. Indices Index Methodology, Standard & Poor's, Sep. 2007.

Blodget, H., Money for Nothing: The Real Trouble with Mutual Funds, Slate.com, Dec. 1, 2004.

"Income Select for Life"; Transamerica Financial Life Insurance Company; https://www.transamericaadvisor.com/contentServer/MediaServer? uri=/site/tciidex/media/PDF/Annuities_TCI/Client_Approved_Material/Tips_and_Techniques/.BRIS.pdf.

"Jackson Enhances Living Benefit Options within its Perspective Family of Variable Annuities"; Business Wire; Apr. 30, 2007.

"Learn the Basics about Lifetime Legacy"; http://www.americo.com/lifetime/lifetimelegacy.html; Accessed Jan. 4, 2008.

"Accelerated Death Benefits"; http://www.medicare.gov/; Accessed Jan. 4, 2008.

"Alternatives to Long Term Care Insurance (LTCi)"; Senior Wealth Protection Advocates; http://www.senior-wealth-protection-advocates.com/long-term-care-insurancealternatives.html; Site Accessed Jan. 4, 2008.

Form N-4, Transamerica Life Insurance Company; Separate Account VA B; filed Apr. 26, 2006.

Form N-4, Transamerica Life Insurance Company; Flexible Premium Variable Annuity-J; Separate Account VA Y; filed Feb. 22, 2006.

"Fidelity.com Glossary" (letter "p"); https://scs.fidelity.com/webxpress/help/topics/help_definition_p.shtml; Accessed Jan. 4, 2008.

Stout, R.G. et al.; "Dynamic Retirement Withdrawal Planning"; Financial Services Review 15 (2006) 117-131.

"Prudential Investments Introduces Strategic Partners Annuity One; New Variable Annuity Offers Investors World-Class Money Managers and Flexible Product Features"; Business Wire, Oct. 9, 2000.

"Retireonyourterms"; http://www.retireonyourterms.com/ glossary/GlossaryText.htm; Accessed Jan. 4, 2008.

Buckingham, B.; "Making IRAs Last a Lifetime with Annuities"; Life & Health Advisor; Mar. 2006.

"RiverSource Innovations Select Variable Annuity"; http://www.riversource.com/rvsc/global/docs/INNOC-SELECT-NY-AAG.pdf.

"Pacific Life Individual (k) Program"; https://annuities.myaccount.pacificlife.com/public/corporate/product_info/pos/guide pos_1911-07b.pdf.

"Just the Facts: The Best of America All American Gold Annuity Key Facts"; Nationwide Financial Services, Inc.; https://ssc.nwseivicecenter.com/media/pdf/product/VAM-0504AO-FI.pdf.

* cited by examiner

| Year | AV | Net Return (%) | AV after Returns | Refund? | Hypothetical Refund | Ending AV after Refund |
|---|---|---|---|---|---|---|
| 1 | $100,000 | -5 | $95,000 | Yes | $950 | $95,950 |
| 2 | $95,950 | -7 | $89,234 | Yes | $892 | $90,126 |
| 3 | $90,126 | 22 | $109,954 | No | $0 | $109,954 |
| 4 | $109,954 | 12 | $123,148 | No | $0 | $123,148 |
| 5 | $123,148 | 13 | $139,157 | No | $0 | $139,157 |
| 6 | $139,157 | 7 | $148,898 | No | $0 | $148,898 |
| 7 | $148,898 | 14 | $169,744 | No | $0 | $169,744 |
| 8 | $169,744 | -9 | $154,467 | Yes | $1,545 | $156,012 |
| 9 | $156,012 | 3 | $160,692 | No | $0 | $160,692 |
| 10 | $160,692 | -9 | $146,230 | Yes | $1,462 | $147,692 |
| 11 | $147,692 | 10 | $162,461 | No | $0 | $162,461 |
| 12 | $162,461 | -2 | $159,212 | Yes | $1,592 | $160,804 |
| 13 | $160,804 | 12 | $180,101 | No | $0 | $180,101 |
| 14 | $180,101 | 12 | $201,713 | No | $0 | $201,713 |
| 15 | $201,713 | -9 | $183,559 | Yes | $1,836 | $185,394 |
| 16 | $185,394 | 11 | $205,787 | No | $0 | $205,787 |
| 17 | $205,787 | -1 | $203,730 | Yes | $2,037 | $205,767 |
| 18 | $205,767 | 7 | $220,171 | No | $0 | $220,171 |
| 19 | $220,171 | 3 | $226,776 | No | $0 | $226,776 |
| 20 | $226,776 | 5 | $238,114 | No | $0 | $238,114 |

*FIG. 4*

| Year | AV | Net Return (%) | AV after Returns | Refund? | Hypothetical Refund | Ending AV after Refund |
| --- | --- | --- | --- | --- | --- | --- |
| 1 | $100,000 | -14% | $86,000 | Yes | $860 | $86,860 |
| 2 | $86,860 | -9% | $79,043 | Yes | $790 | $79,833 |
| 3 | $79,833 | 7% | $85,421 | Yes | $854 | $86,276 |
| 4 | $86,276 | 15% | $99,217 | Yes | $992 | $100,209 |
| 5 | $100,209 | 12% | $112,234 | No | $0 | $112,234 |
| 6 | $112,234 | -7% | $104,378 | No | $0 | $104,378 |
| 7 | $104,378 | 3% | $107,509 | No | $0 | $107,509 |
| 8 | $107,509 | -9% | $97,833 | Yes | $978 | $98,812 |
| 9 | $98,812 | 10% | $108,693 | No | $0 | $108,693 |
| 10 | $108,693 | -2% | $106,519 | No | $0 | $106,519 |
| 11 | $106,519 | 17% | $124,627 | No | $0 | $124,627 |
| 12 | $124,627 | 21% | $150,799 | No | $0 | $150,799 |
| 13 | $150,799 | -9% | $137,227 | No | $0 | $137,227 |
| 14 | $137,227 | 11% | $152,322 | No | $0 | $152,322 |
| 15 | $152,322 | -1% | $150,799 | No | $0 | $150,799 |
| 16 | $150,799 | 14% | $171,910 | No | $0 | $171,910 |
| 17 | $171,910 | 3% | $177,068 | No | $0 | $177,068 |
| 18 | $177,068 | 5% | $185,921 | No | $0 | $185,921 |
| 19 | $185,921 | 14% | $211,950 | No | $0 | $211,950 |
| 20 | $211,950 | -7% | $197,114 | No | $0 | $197,114 |

FIG. 6

SYSTEM AND METHOD FOR ADMINISTERING VARIABLE ANNUITIES

FIELD OF INVENTION

The present invention relates to computer systems, and particularly to computer systems for calculating features of financial products.

BACKGROUND

An annuity is a type of insurance service. In general terms, in an annuity contract, an insurance company and an annuitant contract for the annuitant to make one or more payments to the insurance company. For that consideration, the insurance company makes periodic payments to an annuitant. By way of example, the insurance company may be obliged to make a payment of a predetermined amount to the annuitant annually for a predetermined time period. In another example, the insurance company is obliged to make payments of a predetermined amount to the annuitant annually for the life of the annuitant.

Annuities may be immediate annuities, in which the stream of payments begins immediately upon purchase of the annuity contract. Annuities may also have a deferral period, in which the stream of payments only begins after expiration of the deferral period. The asset value of an annuity upon the commencement of a stream of payments generally is a significant factor in determining the amount of the payments. During the deferral period, the insurance company may credit the account with interest. An account bearing a fixed rate of interest provides predictable gains. However, over almost all periods of more than a few years since 1945, stock market indices at least in the United States have generally provided better investment returns than fixed-interest assets.

In a variable annuity, the asset value is determined by changes in values of one or more securities funds. In a variable annuity, the annuitant may select a fund from a menu of funds that the insurance company makes available. The funds are managed by a third party investment adviser, and not the insurance company. The investment adviser receives compensation for its services in the form of a management fee. The management fee is generally based on a percentage of the asset value of the account invested in the fund. The management fee amount is generally quoted to the annuitant on an annual basis, although it may be assessed, by a deduction from the net asset value of the account, on the basis of a business day. The insurance company collects the deduction from the net asset value of the account, and pays the investment adviser from that deduction.

SUMMARY OF THE INVENTION

In an embodiment, a system for administering a variable annuity account includes a processor and a memory in communication with the processor. The processor is adapted to: access from a memory storage device data indicative of a change over a time period in value of a fund within the variable annuity account; if, based on the accessed data, the fund value declined during the time period, then determine that an amount based on a fund management fee charged to the account over the time period is to be refunded; if the amount is to be refunded, access data indicative of the fund management fee, and determine the refund amount; access data indicative of the asset value of the account; determine an updated asset value based on the asset value and the refund amount; store the determined updated asset value in a memory storage location; and provide an output signal including data indicative of the increase in the asset value of the account as a result of the refund.

In an embodiment, a system for administering a variable annuity account includes a processor and a memory in communication with the processor. The processor is adapted to: access from a memory storage device data indicative of actual performance of at least a fund within the variable annuity account; access from a memory storage device data indicative of benchmark performance; compare the actual performance data to the benchmark performance data, and store the result of the comparison in the memory; based on the results of the step of comparing, determine whether to refund to the account an amount; if the amount is to be refunded, access data indicative of the refund amount; access data indicative of the asset value of the account; determine an updated asset value based on the asset value and the amount to be refunded; store the determined updated asset value in a memory storage location; and provide an output signal including data indicative of the change in the asset value of the account.

In an embodiment, a computer-implemented method for administering a variable annuity account includes: accessing from a memory storage device data indicative of actual performance over a time period in value of a fund within the variable annuity account; accessing from a memory storage device data indicative of benchmark performance of the fund; comparing the actual performance data to the benchmark data, and storing the result of the comparison in the memory; based on the results of the step of comparing, determining whether to refund an amount to the account; if the amount is to be refunded, accessing data indicative of the value of the amount to be refunded; accessing data indicative of the asset value of the account; determining an updated asset value based on the asset value and the amount to be refunded; storing the determined updated asset value in a memory storage location; and providing an output signal including data indicative of the change in value to the net asset value of the account.

In an embodiment, a computer-readable medium has instructions thereon which, when executed by a processor, cause the processor to perform the steps of: accessing from a memory storage device data indicative of actual performance over a time period in value of a fund within the variable annuity account; accessing from a memory storage device data indicative of benchmark performance of the fund; comparing the actual performance data to the benchmark data, and storing the result of the comparison in the memory; based on the results of the step of comparing, determining whether to refund an amount to the account; if the amount is to be refunded, accessing data indicative of the value of the amount to be refunded; accessing data indicative of the asset value of the account; determining an updated asset value based on the asset value and the amount to be refunded; storing the determined updated asset value in a memory storage location; and providing an output signal including data indicative of the change in value to the net asset value of the account.

BRIEF DESCRIPTION OF THE DRAWINGS

FIG. 4 is a table illustrating an example of a method of FIG. 3.

FIG. 6 is a table illustrating an example of a method of FIG. 5.

DETAILED DESCRIPTION

It is to be understood that the figures and descriptions of the present invention have been simplified to illustrate elements that are relevant for a clear understanding of the present invention, while eliminating, for the purpose of clarity, many other elements found in typical computer systems, and methods for administration of insurance products such as annuities. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein.

Figure 1:
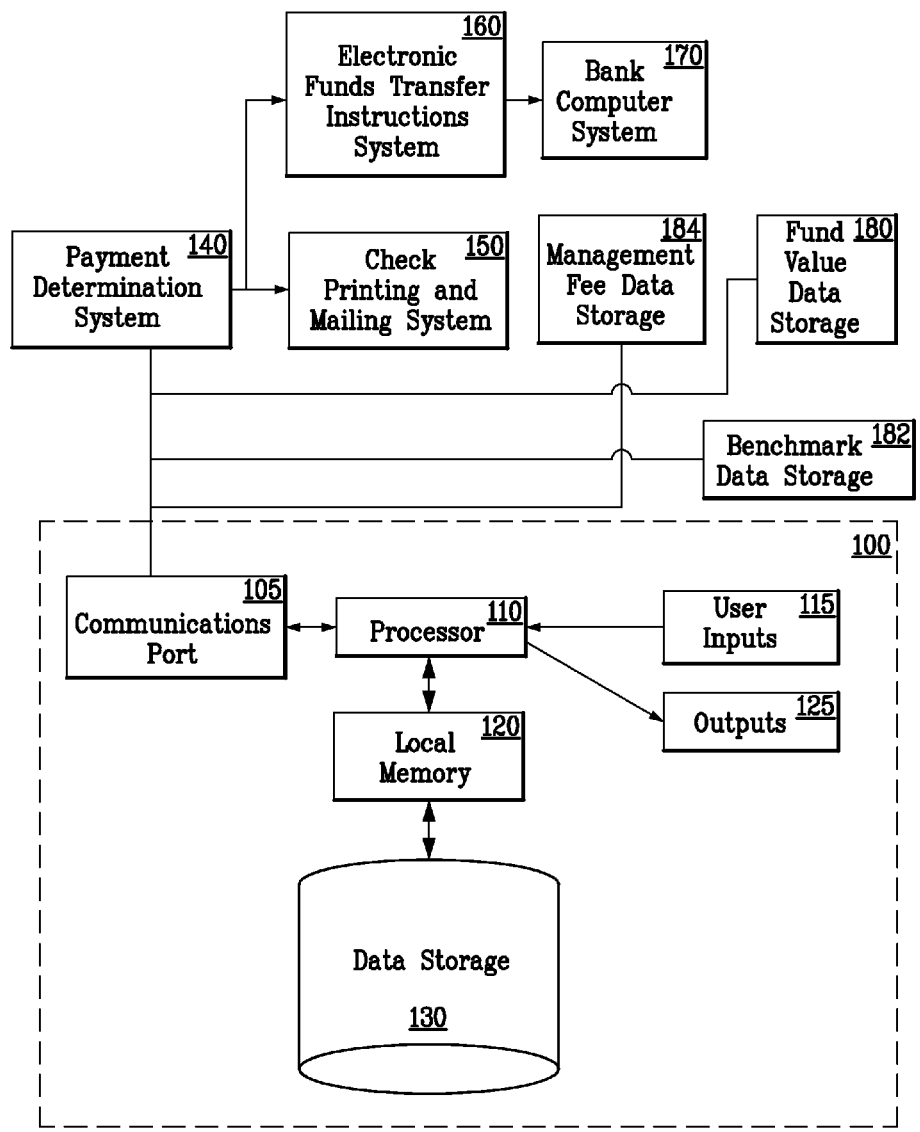
FIG. 1 is a schematic diagram of an exemplary computer system for implementation of a method and system of the invention.

Referring to FIG. 1, an exemplary computer system for use in the implementation of the invention will now be described. In computer system 100, processor 110 executes instructions contained in programs stored on recorded media. Processor 110 communicates, such as through suitable buses and other data channels, with communications port 105 and local memory 110, receives data from user inputs 115, and provides data to outputs 125. Local memory 120 is configured to exchange data with processor 110, and may store programs containing processor-executable instructions, and values of variables for use by such programs. Data storage 130 may include a wide variety of data acquired and processed in accordance with the invention. User input may be provided at inputs 115, which may include keyboards, mice and touchscreens. Outputs 125 may include displays and printers. Communications port 105 communicates with remote sources of information. Communication may be by one or more of suitable communication methods, including over wired or wireless local area networks and wide area networks, and over communications between networks, including over the Internet. Any suitable data and communication protocols may be employed.

A challenge that has been recognized by the inventors is that some annuitants or prospective annuitants, or those contemplating purchasing annuities for others, may be reluctant to purchase variable annuities because of the risk of loss of asset value of the annuity. Asset value of the annuity may decline along with fund values, as a result of a decrease in value of the securities making up the fund.

Figure 3:
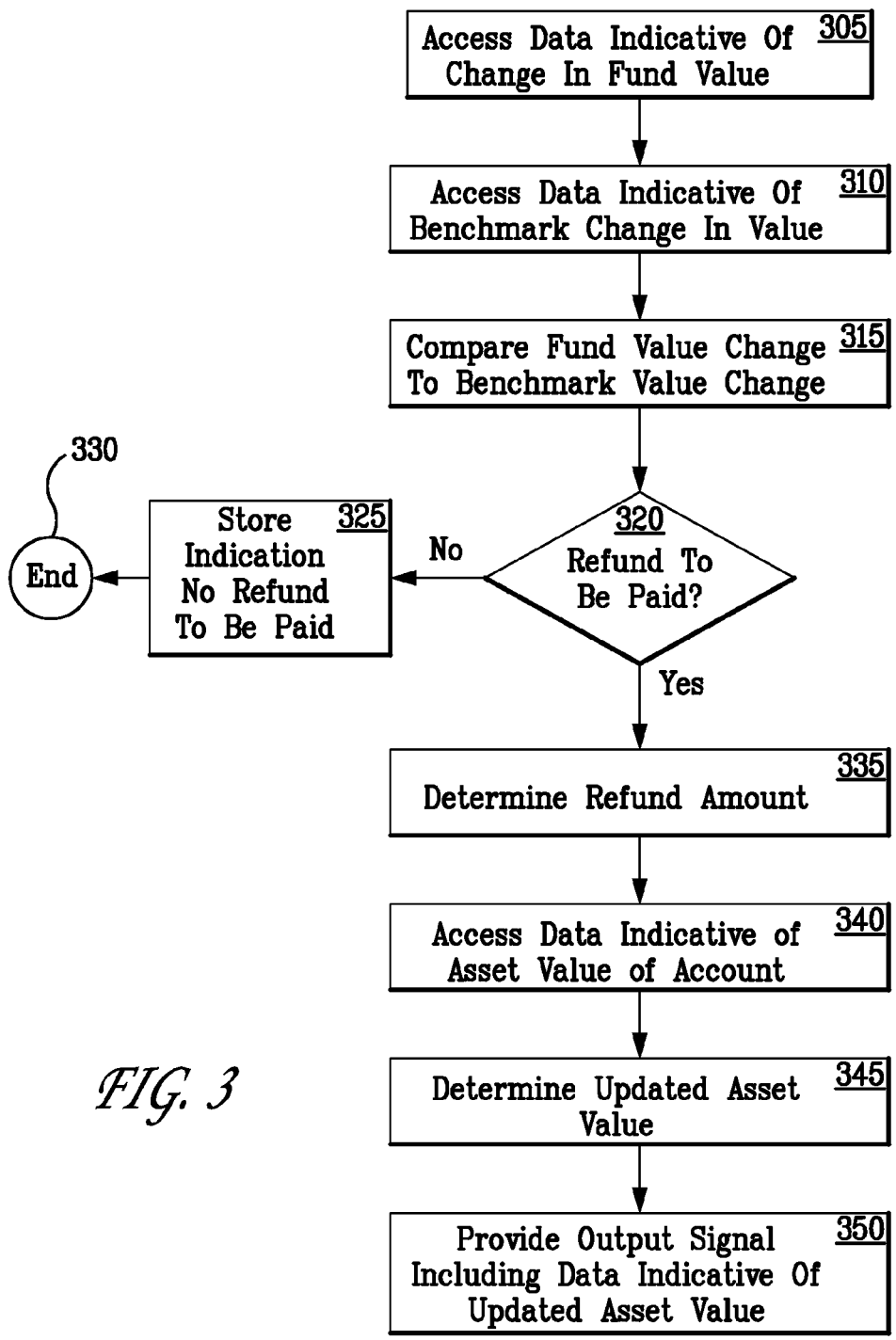
FIG. 3 is a process flow diagram illustrating a method for administering annuities implemented by the computer system of FIG. 1.

Referring now to FIG. 3, a high level process flow of a method for administering an annuity product will be explained, with reference to the computer system of FIG. 1. In accordance with an implementation, an insurance company and a user, who may be the annuitant, have entered into an insurance contract for funding of an annuity. The contract involves the payment to the insurance company of an initial amount to establish an asset value. In the present implementation, the annuity is a variable annuity. The variable annuity asset value is invested in one or more funds. Those funds are managed by an investment adviser, which is not the insurance company. A separate contract between the insurance company and the investment adviser provides for payment by the insurance company to the investment adviser of a management fee, which may be based on the net asset value of the variable annuity accounts for which the investment adviser's fund or funds have been selected. Under the insurance contract, the insurance company is permitted to deduct from the asset value of the annuity a sum equal to the management fee charged by the investment adviser. The insurance company may calculate a fractional share of the investment adviser's fee on a periodic basis, such as daily, and deduct that amount from the asset value of the account.

Processor 110 may access from memory storage device 180, data indicative of actual performance of at least a fund within the variable annuity account. The data indicative of performance may be fund data, as in the embodiment of FIG. 3. The data indicative of performance may be the asset value of the account, or of the portion of the account invested in the fund, as in the embodiment of FIG. 5, which is discussed below.

Referring again to FIG. 3, processor 110 accesses 305, from a memory storage device, such as memory storage 180, data indicative of a change over a time period in value of a fund within the variable annuity account. The data may be stored in local memory 120. The fund data may be in the form of daily values of share prices, and dividend data, for example. In that event, processor 105 may engage in calculations to determine changes in value over a time period. In an example, the time period may be between anniversary dates of the annuity account. In that event, an algorithm may be stored, such as in local memory 120, which directs the processor to determine the anniversary dates of the account, and to obtain fund share prices at close on the prior anniversary and on the most recent anniversary, and to access data regarding dividends. It will be appreciated that dividends are reinvested as purchases of additional shares or fractional shares. Based on the share values and dividend reinvestment information, processor 105 may calculate a change in value over a selected time period, such as a year, and store the change, expressed in relative terms, such as in the form of a percentage gain or loss, in local memory 120.

Processor 105 may access data indicative of benchmark performance. The benchmark may be a benchmark change in fund value, such as fund benchmark data, as discussed in connection with the embodiment of FIG. 3. The benchmark may be based on the initial asset value, as discussed in connection with the embodiment of FIG. 5

Referring again to FIG. 3, processor 105 may access 310 from a memory storage device, such as device 182, data indicative of a benchmark change in value. The benchmark may be a fixed amount over the time period. For example, the benchmark may be no change in value over the time period. The benchmark may be based on economic data, for example. The benchmark may be based on government economic data. For example, the benchmark may be based on a general measure of economic output, such as the gross domestic product data produced by the Bureau of Economic Analysis of the U.S. Department of Commerce. A benchmark may be based on a securities index. In an implementation, a benchmark may be based on a general securities index, such as the Dow-Jones Industrial Average or the S&P 500. In an implementation, if the fund has an investment strategy, the benchmark may be selected as reflecting the same or a substantially similar strategy. For example, if the fund is a broad small capital stock fund, then the benchmark might be small cap index, such as the Morningstar Small Cap Index, or the Russell 2000 Index. The use of benchmark indices in connection with comparing the performance of funds to markets as a whole is well known.

Processor 110 may access the value of the index on the prior anniversary date of the annuity, store that value in local memory 120, access the value of the index on the current anniversary date of the annuity, store that value in local memory 120, and then calculate the benchmark value change as a relative difference, such as in the form of a percentage gain or loss. The benchmark value change may then be stored in local memory 120.

Processor 110 may then compare 315 the fund value change to the benchmark value change, and store the result of the comparison in local memory 120. The comparison may be a simple comparison, such as simply determining whether the change in the fund value is greater than, less than, or equal to the index. The comparison may calculate a difference in percentage changes. In either event, the result of the comparison may be stored in local memory 120. The nature of the comparison may be determined by the terms of the insurance contract. For example, if the contract calls for a refund if the fund performance falls below a single set threshold percentage, then a simple threshold comparison is involved.

Based on the results of the step of comparing, the processor determines 320 whether to refund to the account an amount. If no refund is to be made, then the processor may cause data to be stored 325 in memory that no refund was due for the relevant time period. For example, a flag may be set in a memory location identified as indicating whether or not a refund was due for the time period. The process flow then ends 330.

If a refund is to be paid, then the processor 110 determines the amount. In an embodiment, the amount may be equal to the management fee for the fund for the time period. In that event, processor 110 may access data storage 184 that contains management fee information. In an embodiment, the amount may be a predetermined dollar amount. The predetermined dollar amount may be stored in data storage 130, for example, and processor 110 may access a memory location in data storage 130. In an embodiment, the amount may be based on a formula in which a dollar amount is multiplied by a factor. The factor may be the net asset value as of a selected date. In that embodiment, processor 110 may obtain the appropriate formula from a memory location, and then calculate the amount based on the formula. In an embodiment, the amount may be determined by a formula multiplying a dollar amount by a percentage differential in performance.

Once the processor has determined the amount to be refunded, and stored that refund amount in memory, the processor may access 340 data indicative of the asset value of the account, and store that data in local memory. The processor may then determine an updated asset value based on the asset value and the amount to be refunded, such as by adding the amounts of the refund and the amount of the asset value, and store the updated asset value in a memory storage location. The processor may then provide 345 an output signal including data indicative of the change in value to the net asset value of the account.

In an implementation, the output signal may include instructions for providing an output that may be perceived by the user. For example, in the example of FIG. 1, outputs 125 may include printers and displays, and a document may be formatted and displayed or printed, including an indication of the amount of the refund, and the asset value of the account after application of the refund.

Figure 2:
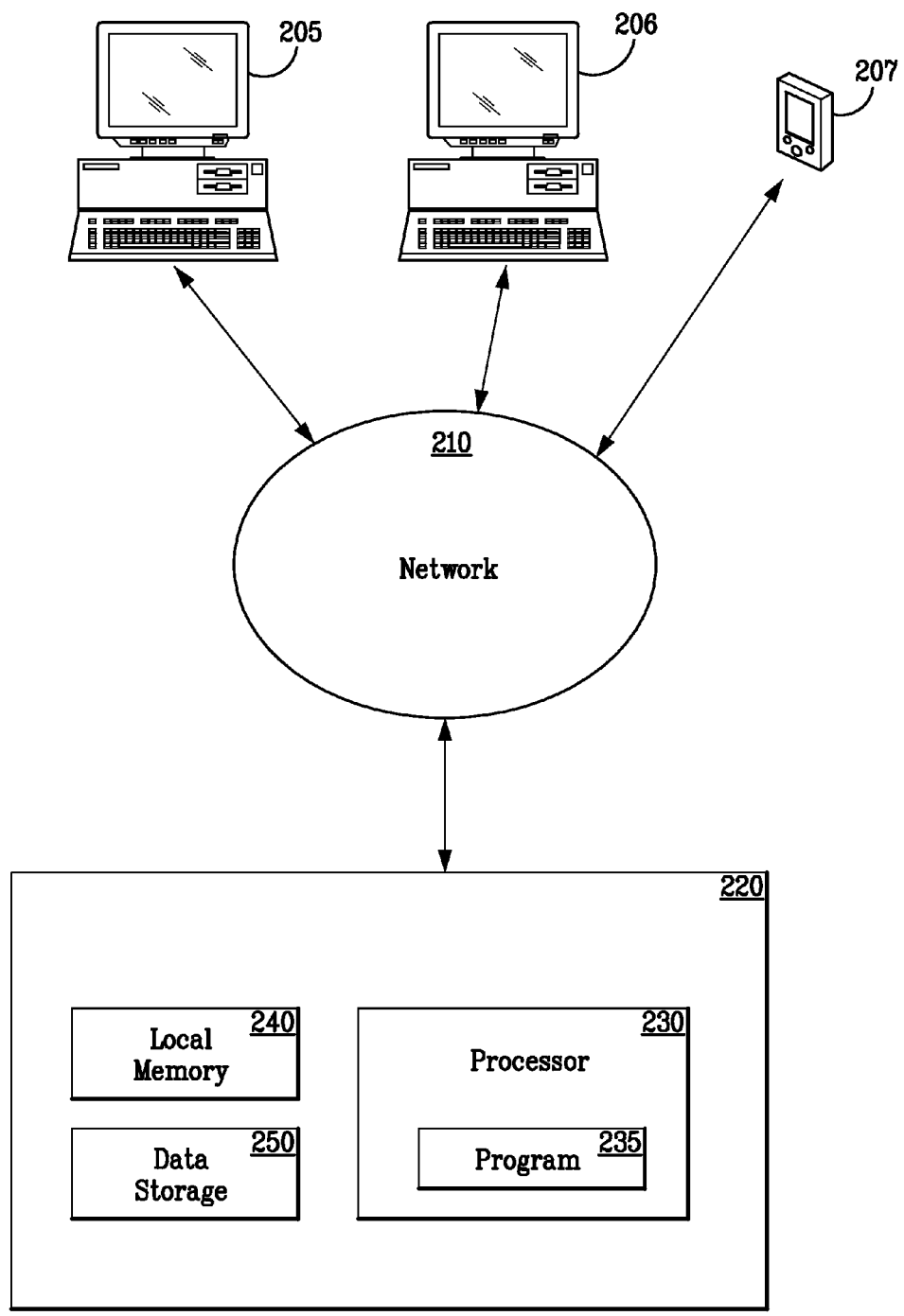
FIG. 2 is a schematic diagram of an exemplary network system for implementation of a method and system of the invention.

In the embodiment of FIG. 2, processor 230 of server 220 may perform the steps described above, in accordance with instructions in program 235. Data storage 250 may be accessed for data including fund value data, benchmark data, management fee data, formula data, and asset value data. Local memory 240 may be employed for temporary storage of data by processor 230. In response to a login and request from a user from one of devices 205, 206, which are represented as computer systems, or device 207 represented as a handheld device, which devices may be running a web browser, communications may be established via network 210. Network 210 may be the Internet, a local area network, a wide area network, a virtual private network, or other network or combination of networks. In response to a request, server 220 may format and provide for display on devices 205, 206, 207, a web page or other display including a determined refund amount and calculated asset value in view of the refund. Devices 205, 206, 207 may have associated memory storage devices in which the refund amount and calculated asset value may be stored, and associated printers on which documents including the refund amount and calculated asset value may be printed.

It will be appreciated that program 225 may have instructions to cause processor 230 to provide, for display on devices 205, 206, 207, an illustration of a hypothetical variable annuity account, showing hypothetical returns on a fund, and calculations of applicable refunds. Referring to FIG. 4, an exemplary illustration is shown. In the illustration of FIG. 4, a twenty-year variable annuity is shown. In the example, the initial asset value is $100,000. The initial asset value may be for an entire account or contract, on the one hand, or only for one fund within an account, on the other hand. For illustrative purposes, various net return amounts are shown. Net returns may include investment performance of the fund net of fees associated with the variable annuity account. Fees associated with a variable annuity account may include, by way of example, mortality and expense charges, administration charges, fund fees (such as 12b-1 charges and management fees), and other expenses. The asset value in each year after returns is shown. The result of the step of determination of whether a refund is to be credited to the account is shown. In this embodiment, if net return for the prior one-year period is negative, then a refund is provided. The refund is in the amount of 1% of asset value at the end of the year. The refund amount may be based on a formula, and may be the same as a management fee charged by the investment adviser of the fund. The refund amount is added to the asset value, providing the ending AV after refund figure. It will be appreciated that, in this embodiment, the effect of fund losses is ameliorated. In addition, the positive effect of the refund is compounded, as the gains in succeeding years are based on the increased asset value of the account. In an embodiment, a user may select an initial asset value, a term, and a fund, and upon receiving signals from the client device indicating the selections, processor 230 may calculate an illustration, such as the illustration shown in FIG. 4, format the illustration and cause the illustration to be displayed on one of the client devices 205, 206, 207.

In an embodiment, the processor may provide an output signal indicative of instructions for payment of the management fee to an investment adviser. It will be appreciated that the payment of the management fee to an investment adviser may be independent of the crediting of a refund to the variable annuity.

In an embodiment, processor 110 may be adapted to receive a signal having data indicative of an instruction to provide a payment from the account, to calculate a payment amount based on the asset value of the account, and to provide an output signal having data indicative of the payment amount.

Communications port 105 may communicate with payment determination system 140. Payment determination system 140 may include one or more computer systems, including processors, memory devices, user inputs, outputs, software executed by the processors, and other conventional components. Payment determination system 140 may be adapted to receive an output signal via communications port 105, which output signal includes payment information, such as an amount, a date payable, and information identifying an annuitant. Payment determination system 140 may further be adapted to determine a payor account and a payment method. The payor account may be an account with a selected bank; by way of example, payment determination system 140 may include a look-up table mapping annuitant information, such as geographic information, to a particular bank and account. Payment determination system 140 may also include, stored in a memory device and accessible by a processor, information indicating whether a particular annuitant is to be paid by paper check, by electronic funds transfer, or in some other manner. A processor of payment determination system 140 may cause to be stored in memory of the payment determination system the determined payor account information and the determined payment method. The processor of payment determination system 140 may cause a digital signal to be output indicative of the stored payor account information, the stored payment method, amount information and payee information.

In an embodiment, the output digital signal may be received by check printing and mailing system 150. Check printing and mailing system 150 may include one or more computer systems, including processors, memory devices, user inputs, outputs, software executed by the processors, and other conventional components. The outputs include in particular one or more printers, and may include other devices useful in printing and mailing paper checks, such as devices for feeding paper, separating printed checks, inserting printed checks into envelopes, sealing envelopes, and applying postage to envelopes as appropriate. The printed check is then mailed to the annuitant. The annuitant deposits the check in the annuitant's bank account, causing funds to be credited to the annuitant's bank account, and causing the funds to be withdrawn from the designated bank account from which the payment is made.

In an embodiment, the output digital signal from payment determination system 140 may be received by electronic funds transfer instructions system 160. Electronic funds transfer instructions system 160 may include one or more computer systems, including processors, memory devices, user inputs, outputs, software executed by the processors, and other conventional components. Electronic funds transfer instructions system 160 includes a processor adapted to provide an output signal indicative of an instruction to a bank determined by the payor account information to provide an electronic funds transfer from the payor account to a payee account in an amount as previously determined, such as by processor 110.

The output signal from electronic funds transfer instructions system 160 may be provided to a bank computer system 170, which carries out an electronic funds transfer, debiting the designated account, and resulting in a credit to a designated annuitant account.

Figure 5:
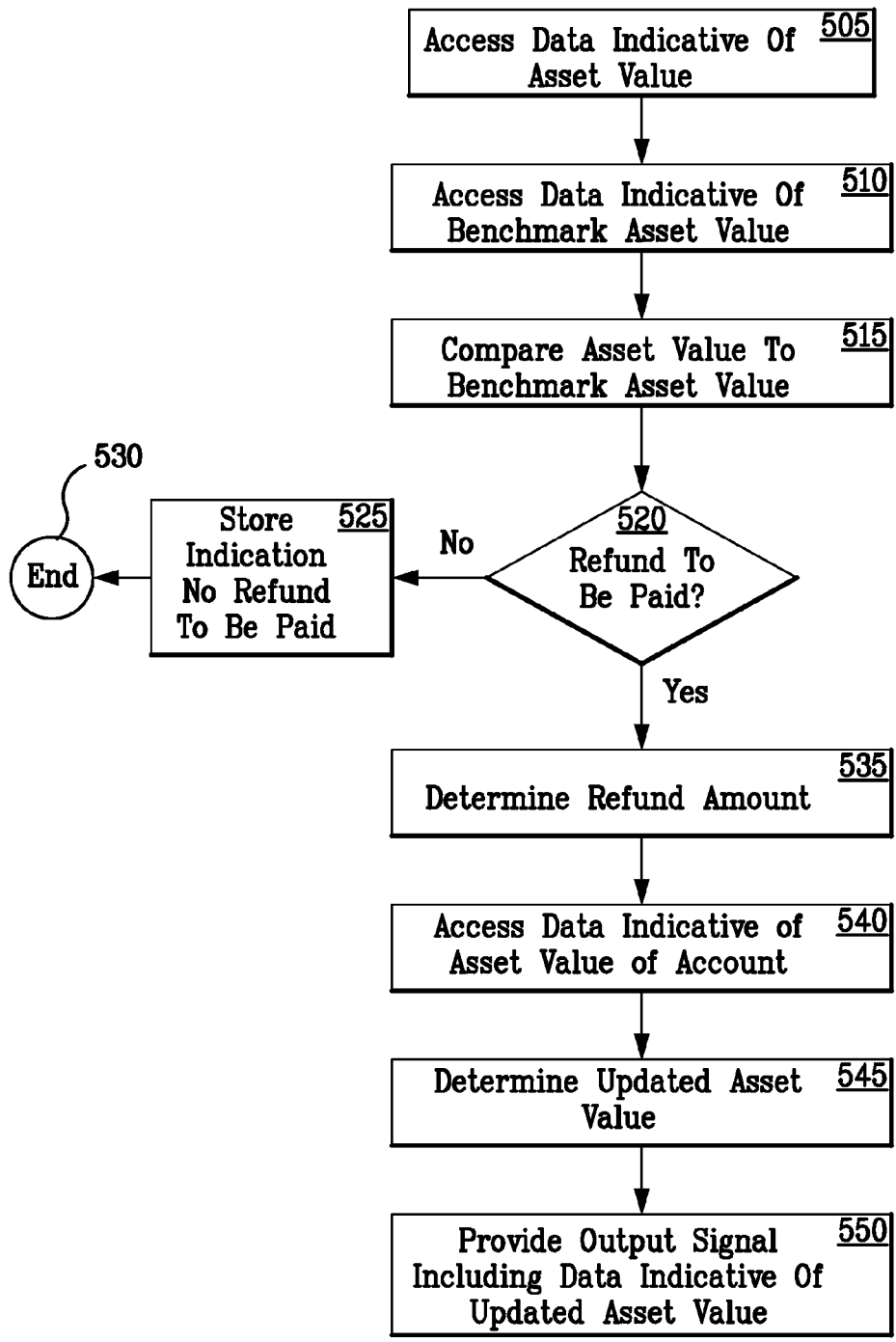
FIG. 5 is a process flow diagram illustrating an alternative method for administering annuities implemented by the computer system of FIG. 1.

Referring now to FIG. 5, a high level process flow of an alternative method for administering an annuity product will be explained, with reference to the computer system of FIG. 1. As with the method of administering an annuity explained above with reference to FIG. 3, an insurance company and a user, who may be the annuitant, have entered into an insurance contract for funding of an annuity, such as a variable annuity. The contract involves the payment to the insurance company of an initial amount to establish an asset value. In the present implementation, the annuity is a variable annuity. The variable annuity asset value is invested in one or more funds. Those funds are managed by an investment adviser, which is not the insurance company. A separate contract between the insurance company and the investment adviser provides for payment by the insurance company to the investment adviser of a management fee, which may be based on the net asset value of the variable annuity for which the investment adviser's fund or funds have been selected. Under the insurance contract, the insurance company is permitted to deduct from the asset value of the annuity a sum equal to the management fee charged by the investment adviser. The insurance company may calculate a fractional share of the investment adviser's fee on a periodic basis, such as daily, and deduct that amount from the asset value of the account. Under the insurance contract in this implementation, the insurance company is required to refund to the annuitant an amount equal to the management fee if the account asset value fails to meet a certain benchmark. The benchmark may be the initial asset value, for example. The benchmark may be based on a formula based on the initial asset value, such as a minimum annual increase in the initial asset value. The minimum annual increase may be a predetermined amount, or may be based on a formula, such as a percentage equal to a selected rate, such as an interest rate, a Fed funds rate, or an inflation rate. A formula may include such a rate as a factor. If the account is invested in more than one fund, a percentage of the asset value of the account corresponding to the portion of the account invested in each fund may be compared to a benchmark. Alternatively, the entire asset value of the account may be compared to a benchmark.

Processor 110 accesses 505, from a memory storage device, such as memory storage 180, data indicative of the asset value of the variable annuity account. The data may be stored in local memory 120. This step may be performed periodically, such as annually on the anniversary of the account. In that event, an algorithm may be stored, such as in local memory 120, which directs the processor to determine the anniversary dates of the account, and to follow the steps of comparison on each such anniversary date.

Processor 105 may access 510 from a memory storage device, such as device 182, data indicative of the benchmark, or the formula used to calculate the benchmark. If a formula is employed, then processor 105 may access elements of the formula from a memory storage device.

Processor 110 may then compare 515 the asset value to the benchmark, and store the result of the comparison in local memory 120. The comparison may be a simple comparison, such as simply determining whether the asset value is greater than, less than, or equal to the benchmark. The comparison may calculate a difference between the asset value and the benchmark, either in absolute terms or in percentage terms. In either event, the result of the comparison may be stored in local memory 120. The nature of the comparison may be determined by the terms of the insurance contract. For example, if the contract calls for a refund if the asset value falls below a set threshold value, such as the initial asset value, then a simple threshold comparison is involved. If the contract calls for varying refund amounts depending on the magnitude of the difference between the asset value and the benchmark, such as the initial asset value, then the comparison may be more involved.

Based on the results of the step of comparing, the processor determines 520 whether to refund to the account an amount. If no refund is to be made, then the processor may cause data to be stored 525 in memory that no refund was due for the relevant time period. For example, a flag may be set in a memory location identified as indicating whether or not a refund was due for the time period. The process flow then ends 530.

If a refund is to be paid, then the processor 110 determines the amount. In an embodiment, the amount may be equal to the management fee for the fund for the time period since the last determination, e.g., since the prior anniversary of the annuity. In that event, processor 110 may access data storage 184 that contains management fee information. In an embodiment, the amount may be a predetermined dollar amount. The predetermined dollar amount may be stored in data storage 130, for example, and processor 110 may access a memory location in data storage 130. In an embodiment, the amount may be based on a formula in which a dollar amount is multiplied by the net asset value as of a selected date. In that embodiment, processor 110 may obtain the appropriate formula from a memory location, and then calculate the amount based on the formula. In an embodiment, the amount may be determined by a formula multiplying a dollar amount by a percentage differential in performance.

Once the processor has determined the amount to be refunded, and stored that refund amount in memory, the processor may access 540 data indicative of the asset value of the account, and store that data in local memory. The processor may then determine an updated asset value based on the asset value and the amount to be refunded, such as by adding the amounts of the refund and the amount of the asset value, and store the updated asset value in a memory storage location. The processor may then provide 545 an output signal including data indicative of the change in value to the net asset value of the account.

Referring now to FIG. 6, an example of a method of administration of an insurance account in accordance with the method of FIG. 5 is shown. In the illustration of FIG. 5, a twenty-year variable annuity is shown. In the example, the initial asset value is $100,000. For illustrative purposes, various net return amounts are shown. Net returns may include investment performance of the fund net of fees associated with the variable annuity account. Fees associated with a variable annuity account may include, by way of example, mortality and expense charges, administration charges, fund fees (such as 12b-1 charges and management fees), and other expenses. The asset value in each year after returns is shown. The result of the step of determination of whether a refund is to be credited to the account is shown. In this embodiment, if the asset value at the end of each one-year period of the annuity is less than the initial asset value, then a refund is provided. The refund is in the amount of 1% of asset value at the end of the year. The refund amount may be based on a formula, and may be the same as a management fee charged by the investment adviser of the fund. The refund amount is added to the asset value, providing the ending AV after refund figure. It will be appreciated that, in this embodiment, the effect of asset value declines is ameliorated. In addition, the positive effect of the refund is compounded, as the gains in succeeding years are based on the increased asset value of the account.

It will be appreciated that the example of FIG. 6 may apply to an entire account, or to a fund within an account. For example, if the account is invested in several funds, the change in asset value attributable to the portion of the account managed by each fund is determined, and the determination of whether or not a refund is due is determined separately.

The present invention is operable with computer storage products or computer readable media that contain program code for causing a processor to perform the various computer-implemented operations. The computer-readable medium is any data storage device that can store data which can thereafter be read by a computer system such as a microprocessor. The media and program code may be those specially designed and constructed for the purposes of the present invention, or they may be of the kind well known to those of ordinary skill in the computer software arts. Examples of computer-readable media include, but are not limited to magnetic media such as hard disks, floppy disks, and magnetic tape; optical media such as CD-ROM disks; magneto-optical media; and specially configured hardware devices such as application-specific integrated circuits (ASICs), programmable logic devices (PLDs), and ROM and RAM devices. Examples of program code include both machine code, as produced, for example, by a compiler, or files containing higher-level code that may be executed using an interpreter. Steps in the computer-implemented methods may be implemented in processors running software stored locally, and/or in configurations such as application service providers, in which certain steps are executed on processors communicating with one another over a network such as the Internet. Either stand-alone computers or client/server systems, or any combination thereof, may be employed.

A system in accordance with the invention may include means corresponding to each step in each method described herein. Each means may be implemented by processor 110 executing instructions contained in programs which may be stored in a storage medium, such as local memory 120 or data storage 130. It will be appreciated that any of the steps in the methods in accordance with the invention described herein may be so implemented.

While the foregoing invention has been described with reference to the above embodiments, various modifications and changes can be made without departing from the spirit of the invention. Accordingly, all such modifications and changes are considered to be within the scope of the appended claims.

What is claimed is:

1. A system for administering a variable annuity account having an asset value, the variable annuity account issued by an insurance company to an owner, and including investment options for selection by the owner, the investment options including funds managed by investment advisers, comprising:

a computer processor;
a memory in communication with the computer processor;
the computer processor being configured to:
access from a memory storage device data indicative of a change in value over a time period of a fund within the variable annuity account, the chance in value being based on investment performance reduced by expenses, the expenses including fund management fees and insurance charges, the insurance charges including mortality and expenses charges and administration charges;
periodically determine an amount of a management fee to be deducted from the asset value of the variable annuity account and paid to an investment adviser managing the at least one fund;
access from a memory storage device data indicative of benchmark performance, the benchmark performance being a fixed non-zero change in value of the fund after expenses, the expenses comprising fund management fees and insurance charges, the insurance charges including mortality and expenses charges and administration charges;

compare the data indicative of the change in value over the time period to the benchmark performance data, and store the result of the comparison in the memory;

based on the result of the comparison, determine whether to refund, by the insurance company, to the account an amount, wherein an amount is to be refunded responsive to determining that the change in value over the time period is less than the fixed non-zero change in value of the fund after expenses;

if the amount is to be refunded, access data indicative of the refund amount;

access data indicative of the asset value of the account;

determine an updated asset value based on adding to the asset value the amount to be refunded;

store the determined updated asset value in a memory storage location;

and provide output data indicative of the amount added to the asset value of the account.

2. The system of claim 1, wherein the processor is further configured to provide output data indicative of instructions for payment of the management fee to the investment adviser.

3. The system of claim 1, wherein the processor is further configured to receive data indicative of an instruction to provide a payment from the account, to calculate a payment amount based on the asset value of the account, and to provide output data indicative of the payment amount.

4. The system of claim 3, further comprising: a payment determination system having a processor for: receiving the data indicative of the payment amount, determining of a payor account and a payment method; storing of the determined payor account information and the determined payment method in a memory of the payment determination system; outputting of data indicative of the stored payor account information, the stored payment method, amount information and payee information; and a payment fulfillment system for receiving the data indicative of the stored payor account information, the stored payment method, amount information and payee information from the payment determination system and for fulfillment of payment in accordance with the data received from the processor of the payment determination system.

5. The system of claim 4, wherein the payment fulfillment system is a check printing and mailing system for printing and mailing a check drawn on the payor account in an amount and to a payee as determined by the data received from the processor of the payment determination system.

6. The system of claim 4, wherein the payment fulfillment system is a system for generating electronic funds transfer requests for providing of an instruction to a bank determined by the payor account information to provide an electronic funds transfer from the payor account to a payee account in an amount determined by the data received from the processor of the payment determination system.

7. The system of claim 1, wherein the output data further comprises data indicative of instructions for printing of a statement including the refund amount.

8. The system of claim 1, wherein the refund amount is equal to a management fee for the fund for the time period.

9. The system of claim 8, wherein the management fee includes a 12b-1 fee.

10. The system of claim 1, wherein the refund amount is a fixed dollar amount.

11. A computer-implemented method for administering a variable annuity account having a asset value, the variable annuity issued by an insurance company to an owner, and including investment options for selection by the owner, the investment options including funds managed by investment advisers, comprising the steps of:

accessing by a computer processor from a memory storage device data indicative of a change in value over a time period of at least one fund within the variable annuity account, the change in value being based on investment performance reduced by expenses, the expenses including fund management fees and insurance charges, the insurance charges including mortality and expenses charges and administration charges;

periodically determining by the computer processor an amount of a management fee to be deducted from the asset value of the variable annuity account and paid to an investment adviser managing the fund;

accessing by the computer processor from a memory storage device data indicative of benchmark performance of the fund, the benchmark performance being a fixed non-zero change in value of the fund after expenses, the expenses comprising mortality and expense charges, administration charges and fund management fees;

comparing by the computer processor the data indicative of the change in value over the time period data to the benchmark data, and storing the result of the comparison in the memory;

based on the result of the comparison, determining by the processor whether to refund, by the insurance company, an amount to the account, wherein an amount is to be refunded responsive to determining that the change in value over the time period is less than the fixed non-zero change in value of the fund after expenses;

if the amount is to be refunded, accessing by the processor data indicative of the value of the amount to be refunded;

accessing by the processor data indicative of the asset value of the account;

determining by the processor an updated asset value based on the asset value and the amount to be refunded;

storing by the processor the determined updated asset value in a memory storage location;

and providing by the processor output data indicative of the change in value to the asset value of the account.

12. The method of claim 11, further comprising providing output data indicative of instructions for payment of the management fee to an investment adviser.

13. The method of claim 11, further comprising receiving data indicative of an instruction to provide a payment from the account; calculating, in response to receipt of the data indicative of an instruction to provide a payment from the account, a payment amount based on the asset value of the account; and providing output data indicative of the payment amount.

14. The method of claim 13, further comprising: in response to receipt of the output data indicative of the payment amount at a payment determination system, determining of a payor account and a payment method; storing of the determined payor account information and the determined payment method in a memory of the payment determination system; outputting by the payment determination system of data indicative of the stored payor account information, the stored payment method, amount information and payee information; and in response to receipt of the data output by the payment determination system, fulfillment by a payment fulfillment system of payment in accordance with the data received from the payment determination system.

15. The method of claim 14, wherein the step of fulfillment comprises printing and mailing a check drawn on the payor account in an amount and to a payee as determined by the data output by the payment determination system.

16. The method of claim 14, wherein the step of fulfillment comprises generating electronic funds transfer requests for providing of an instruction to a bank determined by the payor account information to provide an electronic funds transfer from the payor account to a payee account in an amount determined by the data output by the payment determination system.

17. The method of claim 11, further comprising providing output data indicative of instructions for printing of a statement including the amount of the refund.

18. The method of claim 11, wherein the refund amount is equal to a management fee for the fund for the time period.

19. The method of claim 18, wherein the management fee includes a 12b-1 fee.

20. The method of claim 11, wherein the refund amount is a predetermined dollar amount.

21. A non-transitory computer-readable medium having a plurality of instructions thereon which, when executed by a processor, cause the processor to perform the steps of:

accessing from a memory storage device data indicative of change in value, based on based on investment performance reduced by expenses, the expenses including fund management fees and insurance charges, the insurance charges including mortality and expenses charges and administration charges over a time period of a fund within a variable annuity account having an asset value, the variable annuity issued by an insurance company to an owner, and including investment options for selection by the owner, the investment options including funds managed by investment advisers;

accessing from a memory storage device data indicative of benchmark performance of the fund, the benchmark performance being a fixed non-zero change in value of the fund after expenses, the expenses comprising mortality and expense charges, administration charges and fund management fees;

periodically determining an amount of a management fee to be deducted from the asset value of the variable annuity account and paid to an investment adviser managing the fund;

comparing the data indicative of the change in value over the time period to the benchmark data, and storing the result of the comparison in the memory;

based on the result of the comparison, determining whether to refund, by the insurance company, an amount to the account, wherein an amount is to be refunded responsive to determining that the actual performance is less than the fixed change in value of the fund after expenses;

if the amount is to be refunded, accessing data indicative of the value of the amount to be refunded;

accessing data indicative of the asset value of the account;

determining an updated asset value based on the asset value and the amount to be refunded;

storing the determined updated asset value in a memory storage location;

and providing output data indicative of the change in value to the asset value of the account.

22. The computer-readable medium of claim 21, wherein the output data is provided to a printer driver to cause a printer to print the determined updated asset value.

23. The computer-readable medium of claim 21, wherein the output data is provided to a video driver to cause a display to display the determined updated asset value.

* * * * *